US012200065B2

(12) United States Patent
Boudia et al.

(10) Patent No.: US 12,200,065 B2
(45) Date of Patent: Jan. 14, 2025

(54) MULTI-PLATFORM CONTENT NORMALIZATION ENGINE

(71) Applicant: AMADEUS S.A.S., Biot (FR)

(72) Inventors: Mourad Boudia, Valbonne (FR); Nicolas Hauviller, Valbonne (FR); Rodolphe Texier, Vallauris (FR); Bilel Ben Romdhanne, Opio (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/134,663

(22) Filed: Apr. 14, 2023

(65) Prior Publication Data
US 2024/0195875 A1  Jun. 13, 2024

(30) Foreign Application Priority Data

Dec. 8, 2022 (EP) .................................... 22315319

(51) Int. Cl.
G06F 15/16 (2006.01)
H04L 67/131 (2022.01)

(52) U.S. Cl.
CPC ................................. H04L 67/131 (2022.05)

(58) Field of Classification Search
CPC ............................. H04L 67/01; H04L 67/131
USPC ......... 709/201–203, 217–219, 227–228, 250
See application file for complete search history.

(56) References Cited

U.S. PATENT DOCUMENTS

| 11,785,299 | B1 | 10/2023 | Wanjari et al. |
| 2003/0097428 | A1* | 5/2003 | Afkhami ................. H04L 67/01 709/226 |
| 2005/0027870 | A1* | 2/2005 | Trebes ................. H04L 12/2854 709/227 |
| 2009/0063491 | A1 | 3/2009 | Barclay et al. |
| 2010/0017283 | A1 | 1/2010 | Hamilton, II et al. |
| 2010/0100828 | A1 | 4/2010 | Khandelwal et al. |
| 2013/0036139 | A1 | 2/2013 | Kung et al. |
| 2013/0117351 | A1* | 5/2013 | Zoheir ................. G06F 16/9577 709/203 |
| 2014/0289241 | A1 | 9/2014 | Anderson |
| 2016/0148192 | A1 | 5/2016 | Storonsky |
| 2016/0255327 | A1 | 9/2016 | Cole et al. |
| 2016/0316243 | A1 | 10/2016 | Park et al. |

(Continued)

FOREIGN PATENT DOCUMENTS

| KR | 102412142 B1 | 6/2022 |
| WO | WO-2021178630 A1 | 9/2021 |
| WO | WO-2022150486 A1 | 7/2022 |

OTHER PUBLICATIONS

Chen, Bohan, et al. "A cross-platform metaverse data management system." 2022 IEEE International Conference on Metrology for Extended Reality, Artificial Intelligence and Neural Engineering (MetroXRAINE). IEEE, 2022.

(Continued)

*Primary Examiner* — Bharat Barot
(74) *Attorney, Agent, or Firm* — Perry + Currier (57) ABSTRACT

The present specification provides a content normalization server and method. The specification can have particular application to client devices with augmented or virtual reality hardware that interact with different platforms with metaverse capabilities. Rich experiences are provided on client hardware while making efficient use of available processing, memory and communication resources.

20 Claims, 8 Drawing Sheets

(56) References Cited

U.S. PATENT DOCUMENTS

| | | | |
|---|---|---|---|
| 2016/0379265 A1 | 12/2016 | Jagota et al. | |
| 2017/0064512 A1 | 3/2017 | Silverberg et al. | |
| 2017/0083626 A1 | 3/2017 | Kensel et al. | |
| 2017/0286539 A1 | 10/2017 | Smith et al. | |
| 2017/0310786 A1 | 10/2017 | Collier et al. | |
| 2017/0316608 A1 | 11/2017 | Khalid et al. | |
| 2017/0339020 A1 | 11/2017 | Khanna | |
| 2018/0046944 A1* | 2/2018 | Barbera | G06Q 50/14 |
| 2018/0088749 A1 | 3/2018 | Yamshita et al. | |
| 2018/0167483 A1 | 6/2018 | Cannon et al. | |
| 2018/0302489 A1* | 10/2018 | Harikumar | H04L 67/5681 |
| 2019/0215373 A1 | 7/2019 | Mathur et al. | |
| 2019/0244237 A1 | 8/2019 | Magnuson, Jr. et al. | |
| 2019/0321725 A1* | 10/2019 | Zimring | G06F 9/45558 |
| 2019/0370492 A1 | 12/2019 | Falchuk et al. | |
| 2020/0230499 A1* | 7/2020 | Buser | H04L 43/04 |
| 2021/0004733 A1 | 1/2021 | Badua et al. | |
| 2021/0303776 A1* | 9/2021 | Morrow | G06F 40/258 |
| 2021/0342754 A1 | 11/2021 | Baalbergen | |
| 2021/0383430 A1 | 12/2021 | Chijimatsu et al. | |
| 2022/0089237 A1 | 3/2022 | Sverdlov et al. | |
| 2022/0132214 A1 | 4/2022 | Felman | |
| 2024/0144571 A1 | 5/2024 | Zavesky et al. | |
| 2024/0160272 A1 | 5/2024 | Soryal et al. | |

OTHER PUBLICATIONS

Steam, "Steam Community Market." SteamCommunity.com, date unknown, Retrieved from the Internet on Jul. 12, 2023 from URL: steamcommunity.com/market/.

Steam, "Steam Community Market?: Listings for Playerunknown Set." Steam.Community.com, date unknown, Retrieved from the Internet on Jul. 14, 2023 from URL: https://steamcommunity.com/market/listings/578080/PLAYERUNKNOWN%20SET. Accessed Jul. 14, 2023.

U.S. Appl. No. 18/134,765, Multi-Platform Virtual Retail Store Engine, filed Apr. 14, 2023.

U.S. Appl. No. 18/134,817, System and Method for Normalization of Electronic Message Content Representing Pricing Across Different Platforms, filed Apr. 14, 2023.

U.S. Appl. No. 18/134,859, Cross Platform Account Unification and Normalization, filed Apr. 14, 2023.

U.S. Appl. No. 18/215,361, Context Based Computing Resource Intermediation Engine, filed Jun. 28, 2023.

U.S. Appl. No. 18/120,085, Computing and Transportation Resource Optimization Engine, filed Mar. 10, 2023.

U.S. Appl. No. 18/134,765, Multi-Platform Virtual Retail Store Engine, Filing Date Apr. 14, 2023.

U.S. Appl. No. 18/134,817, System and Method for Normalization of Electronic Message Content Representing Pricing Across Different Platforms, Filing Date Apr. 14, 2023.

U.S. Appl. No. 18/134,859, Cross Platform Account Unification and Normalization, Filing Date Apr. 14, 2023.

U.S. Appl. No. 18/767,324, A Device, System, and Method for Implementing a Computing Resource Optimization Engine, Filing Date Jul. 9, 2024.

U.S. Appl. No. 18/215,361, Context Based Computing Resource Intermediation Engine, Filing Date Jun. 28, 2023.

U.S. Appl. No. 18/120,085, Computing and Transportation Resource Optimization Engine, Filing Date Mar. 10, 2023.

Berki, Borbála. "2d advertising in 3d virtual spaces." Acta Polytechnica Hungarica 15.3 (2018): 175-190.

Coinbase, "Understanding the order types", help.coinbase.com, 2023, Retrieved from the Wayback Machine on Oct. 8, 2024 from URL: https://web.archive.org/web/20230531010333/https:/help.coinbase.com/en/coinbase/trading-and-funding/advanced-trade/order-types.

* cited by examiner

MULTI-PLATFORM CONTENT NORMALIZATION ENGINE

CROSS-REFERENCE TO RELATED APPLICATION(S)

This application claims the benefit of European Patent Application No. 22315319.8, filed Dec. 8, 2022, entitled "MULTI-PLATFORM CONTENT NORMALIZATION ENGINE"; the entire contents of which are incorporated herein by reference.

BACKGROUND

Internet browsing began with the original hypertext markup language (HTML). HTML has iterated to its fifth version and continues to evolve. Elegant web browsing experiences are now commonplace, even on wireless mobile phones with small screens. With the correct equipment, augmented reality and virtual reality are on the cusp of providing even richer experiences than offered by traditional browsing. Standard Internet speeds now offer commonplace real time communication amongst large groups of people. At the same time, Internet content is increasing in volume and changing rapidly. Enormous unresolved challenges are present in distributing the latest interactive content to an ever-expanding array of client devices with increasingly diverse sets of input/output devices.

SUMMARY

An aspect of the present specification provides an adaptation engine comprising a network interface configured to communicate with a platform server. The platform server is configured to provide a session with a client device. The adaptation engine includes a processor having access to a memory for storing content for rendering over the session. The processor is configured to: receive a request for content to be delivered to the client device from the platform server; determine a platform server computing resource capability; determine a client device computing resource capability; define a session computing resource capability for the session based on the platform server computing resource capability and the client device computing resource capability; access, from the memory, essential content respective to the request; access, from the memory, additional content augmenting the essential content, based on the session computing resource capability; and, generate a response to the request based on the essential content and the additional content.

The platform computing resource capability can include one or more of an augmented reality environment, a virtual reality environment or a metaverse.

The request can be automatically generated by the platform within based on contextual demographic information of an account associated with the client device accessing other content hosted by the platform.

The client device capability can include augmented reality hardware or virtual reality hardware.

The processor can be further configured to select the essential content and any additional content by from aggregated content the combines a plurality of different content. The different content can be stored on different content engines accessible to the adaptation engine via a content aggregation engine.

The platform computing resource capability can be a website and the computing resource capability can be one of a laptop computer, a desktop computer or a mobile phone.

The request can include an electronic request for content relating to travel services directly from the client device. The travel services request can include any aspect of a travel experience, such as a seat selection on a transportation vehicle.

The request can include an electronic request for content relating retail product purchases, medical services, real estate services, and online retail purchases.

Another aspect of the specification provides a device comprising: a communication interface configured to communicate with a metaverse server configured to provide a given metaverse space; and a processor having access to a memory storing metaverse items for rendering in one or more metaverse spaces, the controller configured to:
   determine metaverse capability data for the given metaverse space;
   determine human-machine interface (HMI) data defining capability of a metaverse HMI for a given user and limits placed on the metaverse HMI to account for accessibility of the given user;
   determine that the given metaverse space is being accessed by the given user using the metaverse HMI;
   one or more of filter and adapt one or more of the metaverse items based on the metaverse capability data and the HMI data; and
   provide the metaverse items, as filtered or adapted, to the metaverse server to cause the metaverse server to provide the metaverse items in the given metaverse space to cause physical feedback to the metaverse HMI to indicate the metaverse items, as filtered or adapted.

The processor can be further configured to determine metaverse capability data for the given metaverse space by communicating with the metaverse server.

The processor can be further configured to one or more of filter and adapt at one or more of the metaverse items based on the metaverse capability data and the HMI data by: one or more of filtering and adapting one or more of the metaverse items to account for one or more of a disability, blindness, color blindness, or deafness of the given user as defined by the HMI data.

The processor can be further configured to one or more of filter and adapt at one or more of the metaverse items based on the metaverse capability data and the HMI data by: one or more of filtering and adapting one or more of the metaverse items to account for an age of the given user as defined by the HMI data.

The processor can be further configured to one or more of filter and adapt at one or more of the metaverse items based on the metaverse capability data and the HMI data by: one or more of filtering and adapting one or more of the metaverse items to account for a defined size of a metaverse location at which the metaverse items are to be located within the given metaverse space as defined by the metaverse capability data.

The processor can be further configured to one or more of filter and adapt at one or more of the metaverse items based on the metaverse capability data and the HMI data by: replacing first metaverse item with a second metaverse item.

The processor can be further configured to one or more of filter and adapt at one or more of the metaverse items based on the metaverse capability data and the HMI data by: ignoring a metaverse item such that the metaverse item is not provided in the given metaverse space.

The processor can be further configured to one or more of filter and adapt at one or more of the metaverse items based on the metaverse capability data and the HMI data by: converting a three-dimensional metaverse item to a two-dimensional metaverse item.

Methods, systems and devices and apparatus according to any combination or variant of the foregoing are contemplated. In particular, apparatus comprising means to implement each of the steps set out in the methods described above or in the accompanying claims are contemplated. Moreover, also contemplated is a computer program, computer program product or computer readable medium comprising instructions which, when executed by a computer, cause the computer to carry out the steps of any of the methods set out above or in any of the accompanying method claims.

DETAILED DESCRIPTION

Figure 1:
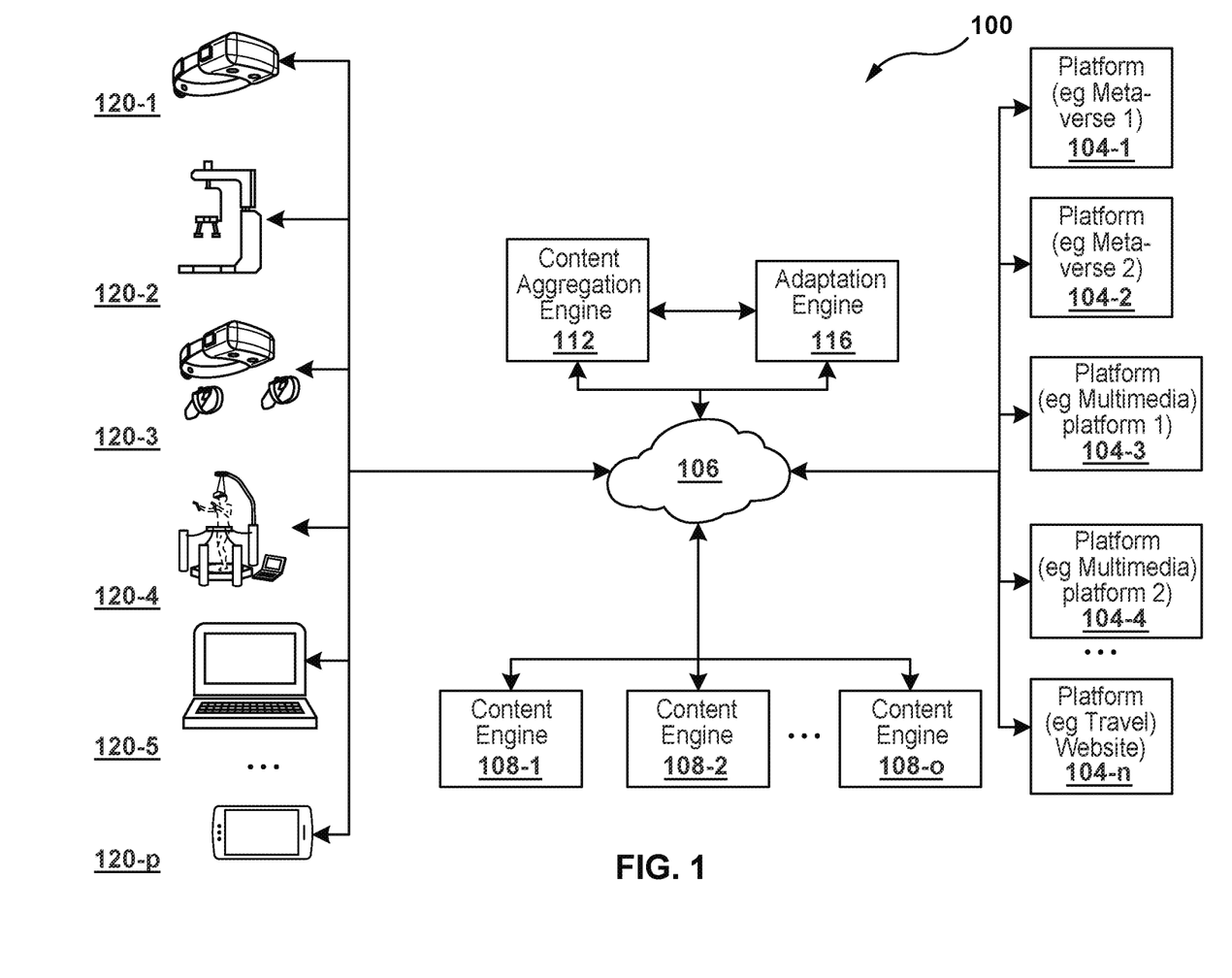
FIG. 1 is a schematic diagram of a system for multi-platform content normalization.

FIG. 1 shows a system for multi-platform content normalization indicated generally at 100. System 100 comprises a plurality of interaction platforms 104 104-1, 104-2 . . . 104-n. (Collectively, platforms 104-1, 104-2 . . . 104-n are referred to as platforms 104, and generically, as platform 104. This nomenclature is used elsewhere herein.) Platforms 104 can be based on any present or future interactive communication platforms such as a simple messaging service (SMS) interactive service, a browser-based e-commerce travel booking environment such as Travelocity™, Expedia™ or any of the individual airline or hotel booking engines. Interactive communication platforms also include social media environments like Facebook™, Tiktok™, or even communication channel such as Whatsapp™, or a massively multi-player environment such as Second Life™, MineCraft™, Fortnite™, or a virtual reality 3D metaverse environment such as Roblox™ or Horizon Worlds™. Certain non-limiting examples for each platform 104 are labelled in FIG. 1 for purpose of discussion. Namely, platform 104-1 is labelled with the example "Metaverse 1" (such as Roblox™ or Horizon Worlds™); platform 104-2 is labelled with the example "Metaverse 2"; platform 104-3 is labelled with the example "Multimedia Platform 1" (such as Second Life™); platform 104-4 is labelled with the "Multimedia Platform 2" (such as Expedia™); platform 104-n is labelled with the "Travel Website"; These examples are nonlimiting and purely illustrative. Other platforms and combinations thereof are contemplated.

In system 100, platforms 104 connect to a network 106. Any network topology is contemplated, such as, by way of non-limiting example, the Internet, one or more intranets, or combinations thereof. Network 106 interconnects platforms 104, with: a) at least one content engine 108; b) at least one content aggregation engine 112 that is coupled with a platform adaptation engine 116; and, c) a plurality of client devices 120. (In a variant, a single content engine 108 would obviate the need for content aggregation engine 112).

As will be explained in greater detail below, each content engine 108 can be based upon its own computing architecture and will periodically send content to aggregation engine 112 for access by one or more client devices 120 via one or more platforms 104. Content engines 108 can be based on any type of known or future Internet content. In a present illustrative, but non-limiting embodiment, content engines 108 are operated by travel actors within the travel industry, including, but not limited to, airlines, railway systems, car rental agencies, cruise line operators, hotels, restaurants, resorts, and spas.

Thusly, content aggregation engine 112 periodically receives data files including content that has been sent by content engines 108 via network 106. In the present example embodiment, content aggregation engine 112 can be operated by, or accessed by, for example, a travel booking engine. To elaborate, a travel booking engine that could operate content aggregation engine 112 could include well-known travel booking engines such as Expedia™, Travelocity™ or Hotels.com™. There are many other travel booking engines. Content engine 112 can thus be operated directly by such a travel booking engine, or can be hosted by a travel data aggregator, often referred to as a Global Distribution System ("GDS"), such as Amadeus™, Sabre™, Travelport™, Apollo™, Galileo™, Travelfusion™, or Duffel™ Aggregation engine 112 thus collects content from content engines 108 for generation on one or more platforms 104, such that content from engines 108 can be accessed by devices 120.

System 100 also includes adaptation engine 116 which normalizes content from engines 108 across platforms 104 and devices 120. Adaptation engine 116 will be discussed in greater detail below.

Client devices 120 can be any type of human-machine interface for interacting with platforms 104. For example, client devices 120 can include virtual reality gear, augmented reality gear or mixed reality gear, such as headsets, tracking headsets, holographic devices, hand controllers, full body sensors, haptic feedback, temperature feedback, smell feedback, treadmill or other foot tracking and feedback technology, and/or combinations of any of the foregoing. In addition, client devices 120 can include smart televisions, traditional laptop computers, desktop computers, mobile phones, tablet computers and any other device that can be used by consumers to receive content via one or more of the platforms 104 that complement the input and output hardware devices associated with a given client device 120. Such traditional client devices 120 can also have connected lights, lightstrips, speakers to provide a multi-media experience on such traditional client devices.

According to the specific example in FIG. 1, device 120-1 is a virtual reality headset; device 120-2 is a first virtual reality station comprising a headset with head, hand and feet tracking technology; device 120-3 is a virtual reality headset with haptic feedback hand controllers; device 120-4 is a second virtual reality station comprising a headset with hand, feet, and torso tracking and haptic feedback technology; device 120-5 is a traditional laptop computer and device 120-p is a traditional mobile telephone. Again, these are non-limiting examples, but their diversity of input and output devices is illustrative of the diverse human-machine interface aspects of the present specification.

Figure 2:
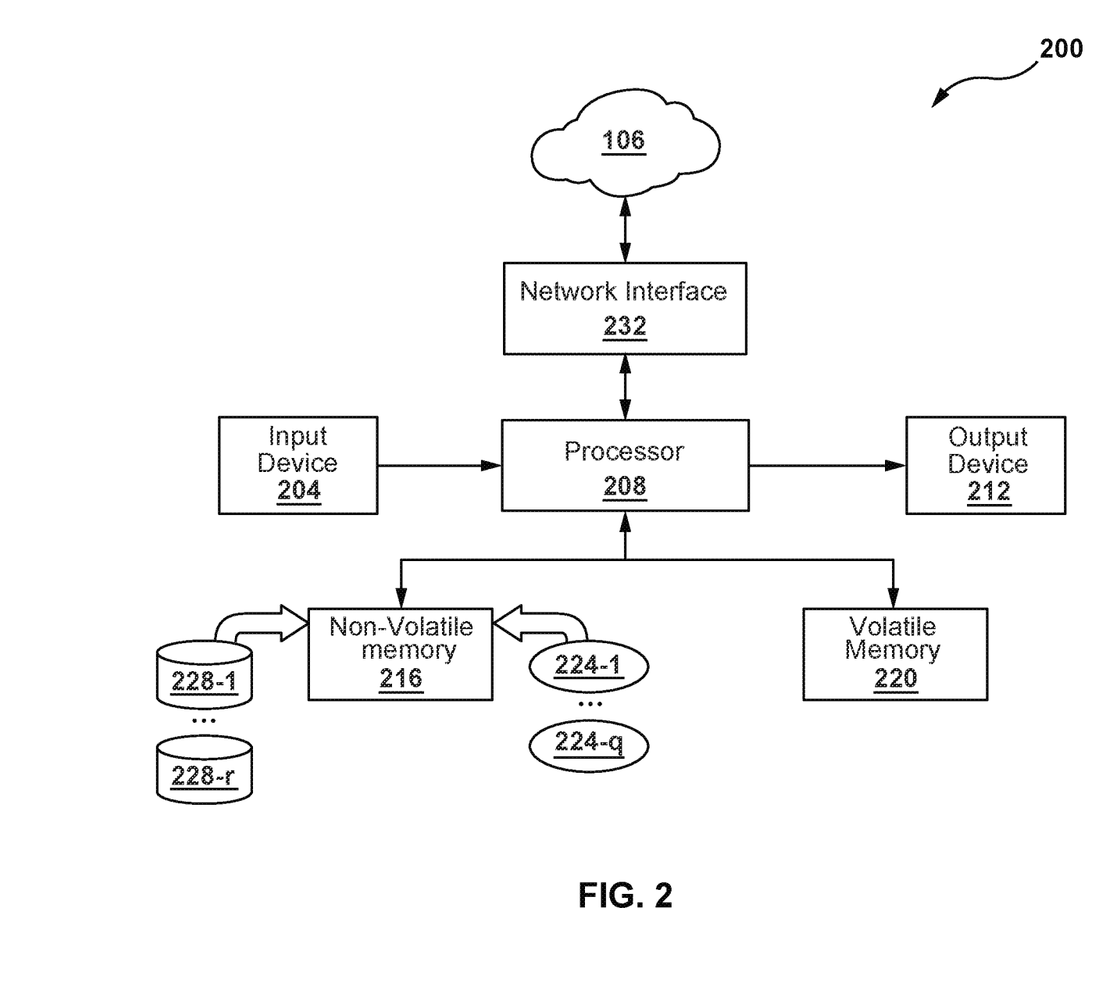
FIG. 2 is a block diagram of example internal components of any server in FIG. 1.

FIG. 2 shows a schematic diagram of a non-limiting example of internal components of a computing device 200. The infrastructure of computing device 200, or a variant thereon, can be used to implement any of the computing nodes, including data source engine 108, data aggregation engine 112, adaption engine 116 or client devices 120. Other than client devices 120 which are based on their own unique input and output hardware form factors as human-machine interfaces, where desired and/or the context permits, one or more of the remaining nodes in system 100 can be implemented virtually inside a single computing device 200.

In this example, computing device 200 includes at least one input device 204. Input from device 204 is received at a processor 208 which in turn controls an output device 212. In the context of all the nodes of system 100, input device 204 can be a traditional keyboard and/or mouse may be connected to provide physical input. Likewise output device 212 can be a display or audio speakers. In variants, additional and/or other input devices 204 or output devices 212 are contemplated or may be omitted altogether as the context requires.

In the specific context of client devices 120, input devices may include physical or virtual keyboards, accelerometers, input buttons, pointing devices, treadmills, temperature sensors, cameras, microphones, global positioning systems (GPS), gyroscopes, olfactometers, velocity sensors, accelerometers, medical sensors (such as pulse rate, blood pressure, stress level, skin moisture level) or any other known or future contemplated input device associated with human-machine interfaces. In the context of client devices 120, output devices may include traditional displays, head-set stereoscope virtual reality displays, augmented or mixed reality displays, haptic feedback, heating or cooling apparatuses, smell generators, sound devices, surround sound systems, smart light bulbs, smart light strips, or any other known or future contemplated output devices associated with human-machine interfaces. Client devices 120 are configured to interact with one or more platforms 104 via network 106 according to the hardware capabilities of a given client device and the corresponding interactive communication capabilities of a given platform 104. (Such hardware, software and interactive communication capabilities may be generically referred to herein as computing resource capabilities.)

Processor 208 may be implemented as a plurality of processors or one or more multi-core processors. The processor 208 may be configured to execute different programming instructions responsive to the input received via the one or more input devices 204 and to control one or more output devices 212 to generate output on those devices.

To fulfill its programming functions, the processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of hard-disk, or combinations of them. Non-volatile memory 216 may also be described as a non-transitory computer readable media. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Processor 208 also connects to network 106 via a network interface 232 which includes a buffer, a modulator/demodulator or MODEM, over the various links and/or internet that connects the server equipment to other server equipment. Depending on the node in system 100, network interface 232 can also be used to connect a given node to another computing device that has an input and output device, thereby obviating the need for input device 204 and/or output device 212 altogether.

Programming instructions in the form of applications 224 are typically maintained, persistently, in non-volatile memory 216 and used by the processor 208 which reads from and writes to volatile memory 220 during the execution of applications 224. One or more tables or databases 228 can also be maintained in non-volatile memory 216 for use by applications 224.

Figure 3:
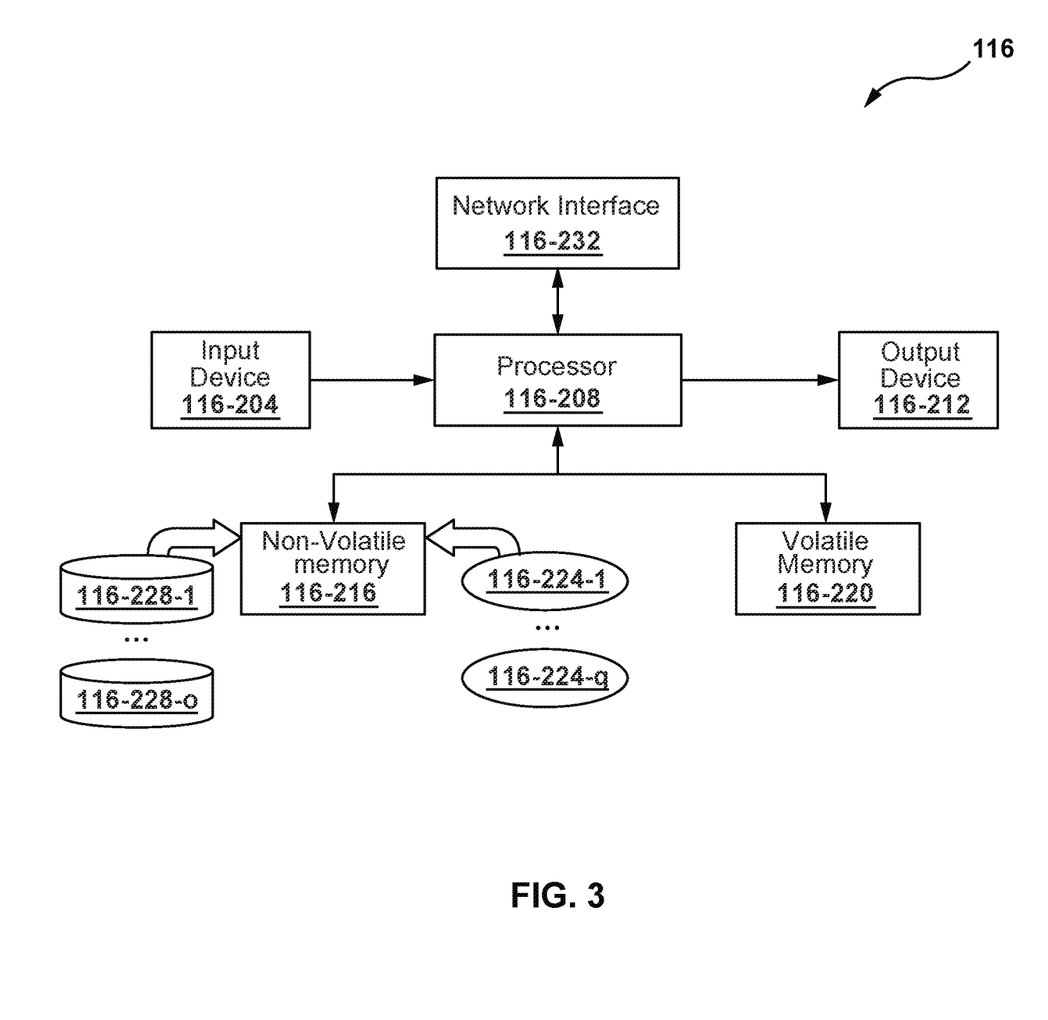
FIG. 3 shows the block diagram of FIG. 2 as applied to the adaptation server of FIG. 1.

FIG. 3 shows adaptation engine 116 in greater detail, identifying its sub-elements according to the structure of computing device 200 from FIG. 2. The nomenclature to identify sub-elements of engine 116 in FIG. 3 borrows from the analogue elements in FIG. 2. Specifically, elements in FIG. 3 are of the format "116-2##" whereby the "116" prefix identifying adaptation engine 116 while the "2##" suffix refers to the corresponding two-hundred series element from FIG. 2. Thus, specific discussion of sub-elements on engine 116 will use this nomenclature hereafter. (This nomenclature may also be used to reference other sub-elements of nodes in system 100 without necessarily specifically showing a corresponding Figure.)

Figure 4:
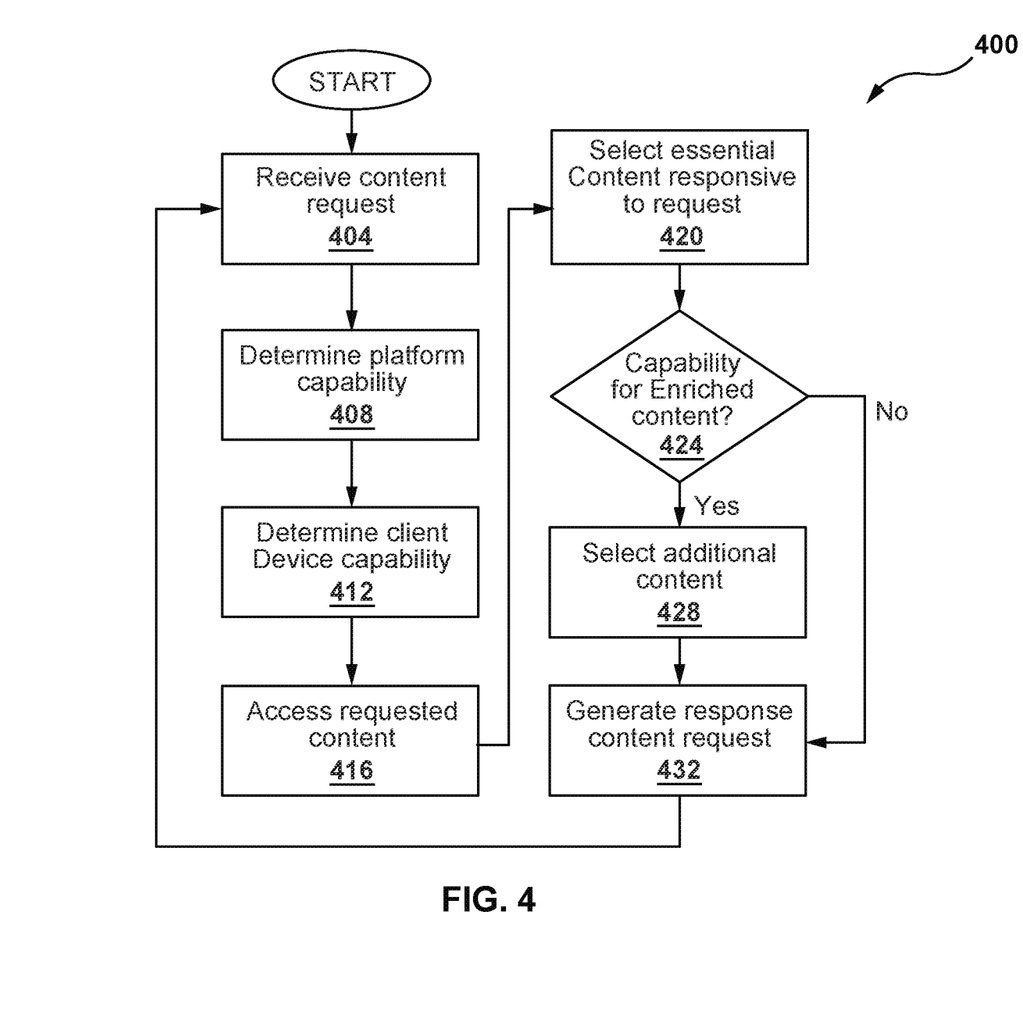
FIG. 4 shows a flowchart depicting a method for multi-platform content normalization.

FIG. 4 shows a flowchart depicting a method for multi-platform content normalization indicated generally at 400. Method 400 can be implemented on system 100. Persons skilled in the art may choose to implement method 400 on system 100 or variants thereon, or with certain blocks omitted, performed in parallel or in a different order than shown. Method 400 can thus also be varied. However, for purposes of explanation, method 400 as per the flow chart of FIG. 4 and will be described in relation to its performance on system 100 with a specific focus on adaptation engine 116 and its interactions with the other nodes in system 100.

Block 404 comprises receiving a content request. The content request can originate from a given client device 120 during a session within a session between that client device 120 and a given platform 104. (Alternatively, or in addition, the content request can originate from a given platform 104 based on an inference made by platform 104 of an experience that is to be tailored to a given client device 120.) The establishment of the session is governed by the architecture of the platform 104, according to the credential management and authentication protocols employed by the platform 104, and according to the account associated with a user of the relevant client device 120. As will be discussed in greater detail below, the specific nature of the content request at block 404 thus depends on the context of the session, but in general terms includes sending the request to content aggregation engine 112 from the platform 104.

Figure 5:
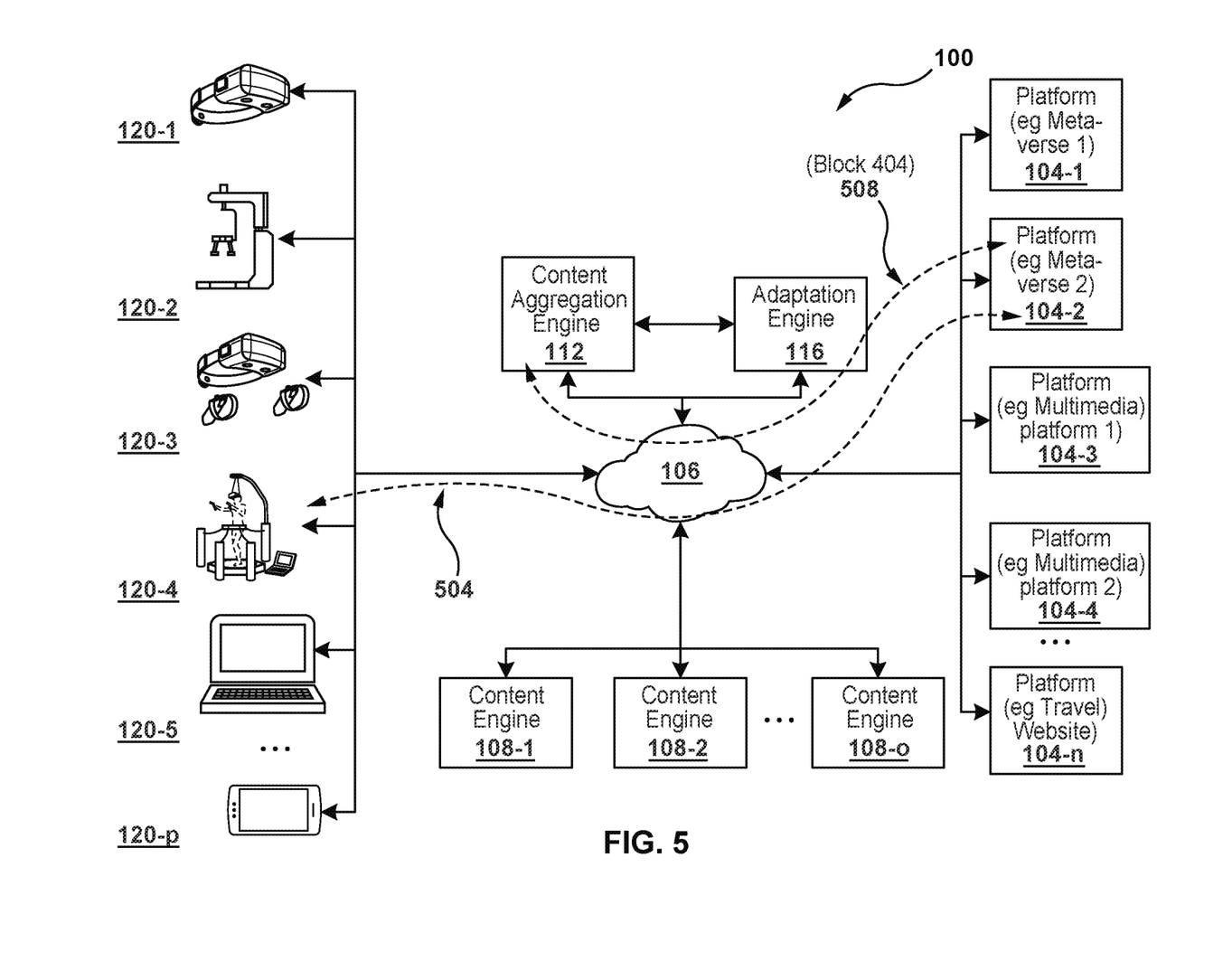
FIG. 5 shows the system of FIG. 1 during a session between a given client device and a given platform.

FIG. 5 shows system 100 illustrating an example session 504 between virtual reality station client device 120-4 and metaverse platform 104-2 expressed as a dotted line between these two nodes. FIG. 5 also shows an example request 508 (representing performance of block 404) from metaverse platform 104-2 to content aggregation engine 112 expressed as a dotted line between these two nodes.

Figure 6:
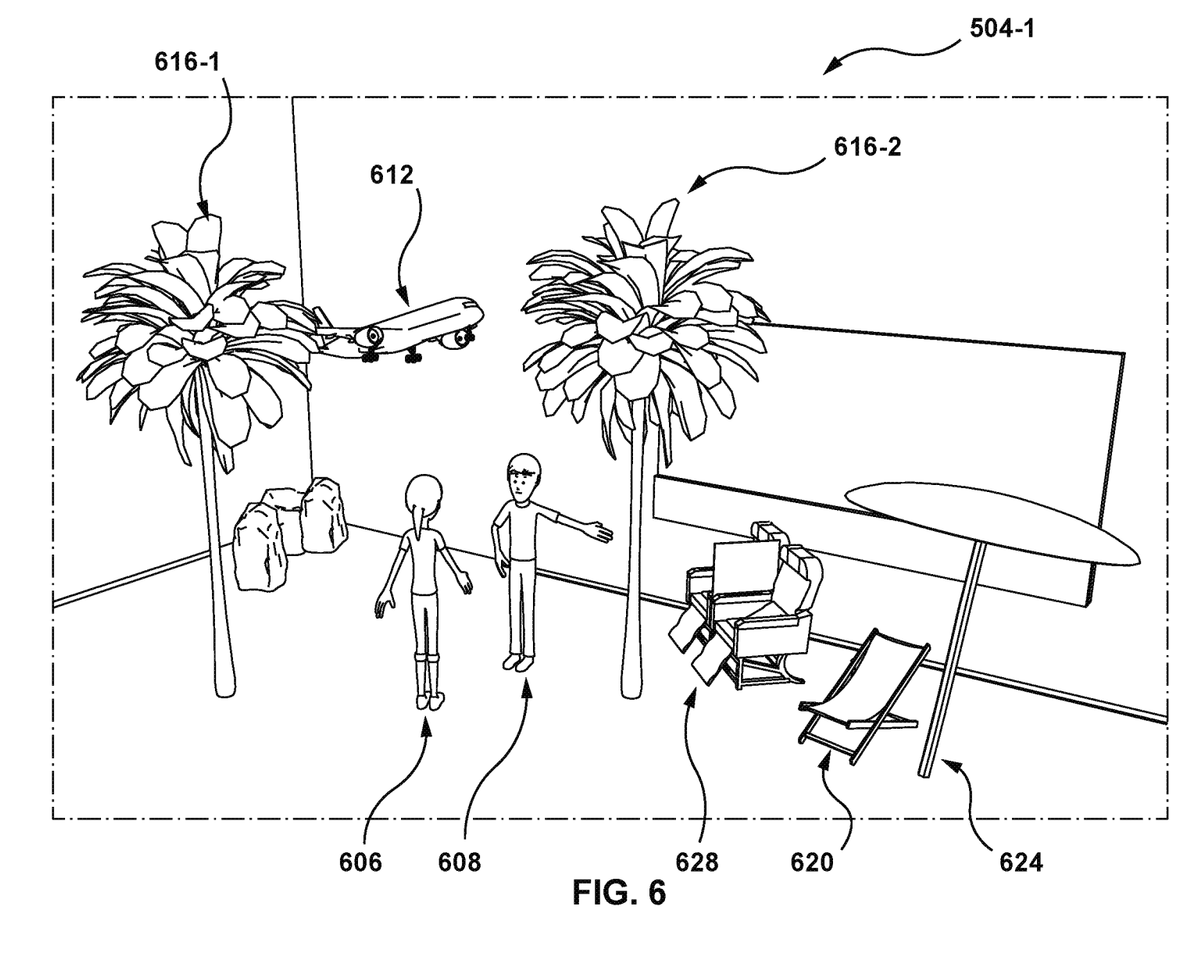
FIG. 6 shows an example rendering of a metaverse environment during the example session of FIG. 5.

The nature of the content request is not particularly limited, but with a few illustrative examples a person of skill in the art will come to appreciate the scope of the present embodiment. As noted earlier, system 100 can have broad application to the travel industry, and thus session 504 can include the opportunity, within a virtual reality environment, to browse, interact with, select and, if desired, provide the technology infrastructure to purchase various travel services. FIG. 6 shows an example illustration of a point in time of session 504-1 within a virtual reality session within metaverse platform 104-2. (The -1 suffix in session 504-1 representing the rendering by platform 104-2 point in time of the session, and this nomenclature is repeated). A person skilled in the art will recognize that the view in FIG. 6 is from a third person perspective, and not from the first-person perspective that could be experienced by the user of client device 120-4 during session 504. Thus FIG. 6 shows a client avatar 606 associated with the user account of client device 120-4. FIG. 6 also shows a travel agent avatar 608 that may be automated or controlled by a human via another client device 120. The entire scene within session 504-1 represents a rendering of a travel agency environment, with client avatar 606 engaging a travel agent avatar 608 to browse travel services. Travel agent avatar 608 is thus shown in FIG. 6 as demonstrating various objects associated with vacation travel including an aircraft 612, palm trees 616, a beach chair 620 and associated umbrella 624 and a pair of airline seats 628.

According to FIG. 6, at this point in session 504-1 client avatar 606 is shown in the seat selection stage of purchasing an airline ticket respective to a given flight on aircraft 612, and thus travel agent avatar 608 is represented as showing airline seats 628 to avatar 606. Thus, according to this example, the request 508 in FIG. 5 can represent a portion of seat selection sub-routine, within an overall flight seat purchasing routine, where that sub-routine includes a request for the seat map associated with aircraft 612 so that a seat within the aircraft 612 for the selected flight can be chosen as part of the purchase of the airline ticket.

At this point the overall context of system 100 should be re-emphasized. In a travel industry context, content aggregation engine 112 can access content from a number of travel industry actors who each host content engines 108. Thus the information regarding the specific flight number that utilizes aircraft 612 and the associated seat map from that flight can be sent from the content engine 108 that manages the flight schedules for that specific flight and aircraft 612. In this manner the travel agent avatar 608 within the metaverse platform 104-2 has access, via content aggregation, to a plurality of travel assets hosted by different content engines 108 as aggregated by content engine 112. Thus the specific seat selection exercise represented within session 504-1 is merely one of many different types of hospitality or travel selection exercises that can be effected within session 504, such as, by way of non-limiting examples, airline ticket purchases, hotel room selection, car rental selection, taxi bookings, excursion bookings, concerts, indoor or outdoor events and festivals, dining receptions, exhibitions, and/or any other travel experience that can occur from the beginning of travel to its conclusion. The client avatar 606 can thus be presented with a complete simulation of the complete travel experience, with browsing and selection options offered throughout the entire simulation. The seat selection request 508 and the seat selection exercise in session 504-1 is thus but one non-limiting illustrative example of the travel purchase interactions contemplated by the present specification. Where system 100 is applied to other industries beyond travel, even more possible types of interactions are possible.

Continuing now with the example of the seat selection, once request 508 (from block 404) is received at content aggregation engine 112, then method 400 advances to block 408.

Block 408 comprises determining the platform capability. In system 100, block 408 is performed by adaption engine 116 working in concert with aggregation engine 112. Adaption engine 116 is thus configured to maintain dataset 116-228-1 which includes all of the capabilities of the various platforms 104. Alternatively, such capabilities may be sent dynamically along with request 508, or a hybrid approach may be employed where some capabilities are stored locally in dataset 116-228-1 while others are sent along with the request 508. Overall, block 408 can be based on an application programming interface (API) or similar functionality provided by the operator of each platform 104. Thus, before a response to the request 508 is made, adaptation engine 116 is configured to assess what forms a response may take that will complement the functionality of the platform 104 that issued the request 508 at block 404.

Continuing with the present example, at block 408, based on the fact that request 508 came from metaverse platform 104-2, the capability determination will note that platform 104-2 is a metaverse environment with a given set of parameters for generating virtual objects and having interactions with those objects according to the specific technological architecture of metaverse platform 104-2. As can be noted from scene 504-1, the metaverse environment is rich and contemplates a virtual reality environment.

Block 412 comprises determining the client device capability. More specifically, block 412 comprises determining the capability of the client device that generated the request 508 at block 404. In system 100, block 408 is performed by adaption engine 116 working in concert with aggregation engine 112. Adaption engine 116 can thus be configured to maintain a second dataset 116-228-2 which includes all of the capabilities of the various client devices 120. Alternatively, such capabilities may be dynamically sent along with request 508, or a hybrid approach is possible where some capabilities are sent with the request 508 and others are maintained within dataset 116-228-2. Indeed, like block 408, block 412 can also be effected as part of any API associated with the relevant platform 104. Such client device capabilities are determined based on the specific input and output device hardware configurations of the human machine interface associated with the requesting client device 120. In the example of FIG. 5, virtual reality station client device 120-4 is noted to be a full body virtual reality rig, complete with haptic feedback and sensing for the eyes, hands, torso, and feet.

Block 416 comprises accessing the requested content. In the specific example being discussed in relation to a seat map for aircraft 612, it is contemplated thus that content aggregation engine 112 will access content with a respective content engine 108, such as a content engine 108 operated by the airline that owns aircraft 612 and is offering the flight of interest to avatar 606.

Block 420 comprises selecting essential content that is responsive to the request from block 404. (Selecting can be effected in different ways, such as through an inclusion process by choosing from a plurality of stored content, or by an exclusion process by filtering out certain content from the plurality of stored content.) Such essential content is the minimum set of content required to fulfill the transaction (or other interaction) occurring in session 504-1; namely, in the present non limiting example, the selection of a seat on aircraft 612. Thus, the minimum information would include what seats remain available on the aircraft in association the pricing of those seats.

Block 424 comprises determining if there is capability for providing enriched content beyond what was filtered at block 420. In the context of the present example, indeed the rich 3D virtual environment of metaverse platform 104-2 combined with the extensive set of virtual reality input and output devices on client machine 120-4 would lead to a "yes" determination at block 424.

Block 428 comprises selecting additional content. (As noted above, selecting can be effected in different ways, such as through an inclusion process by choosing from a plurality of stored content, or by an exclusion process by filtering out certain content from the plurality of stored content.) The additional selected content is responsive to the request from block 404 and matches any enhanced hardware and software capabilities of the platform 104 and the corresponding client device 104 that is carrying the respective session 504. To clarify, such enhanced hardware and software capabilities refer to any capabilities that go beyond the ability to generate the essential content from block 420. Continuing with the present example, block 428 would take the full set of rich content from block 416 to generate a very rich seat map of all available seats on aircraft 612. As will be explained further below, the degree of "richness" corresponds directly to the hardware of client machine 120 and the platform 104 that generated the request.

Figure 7:
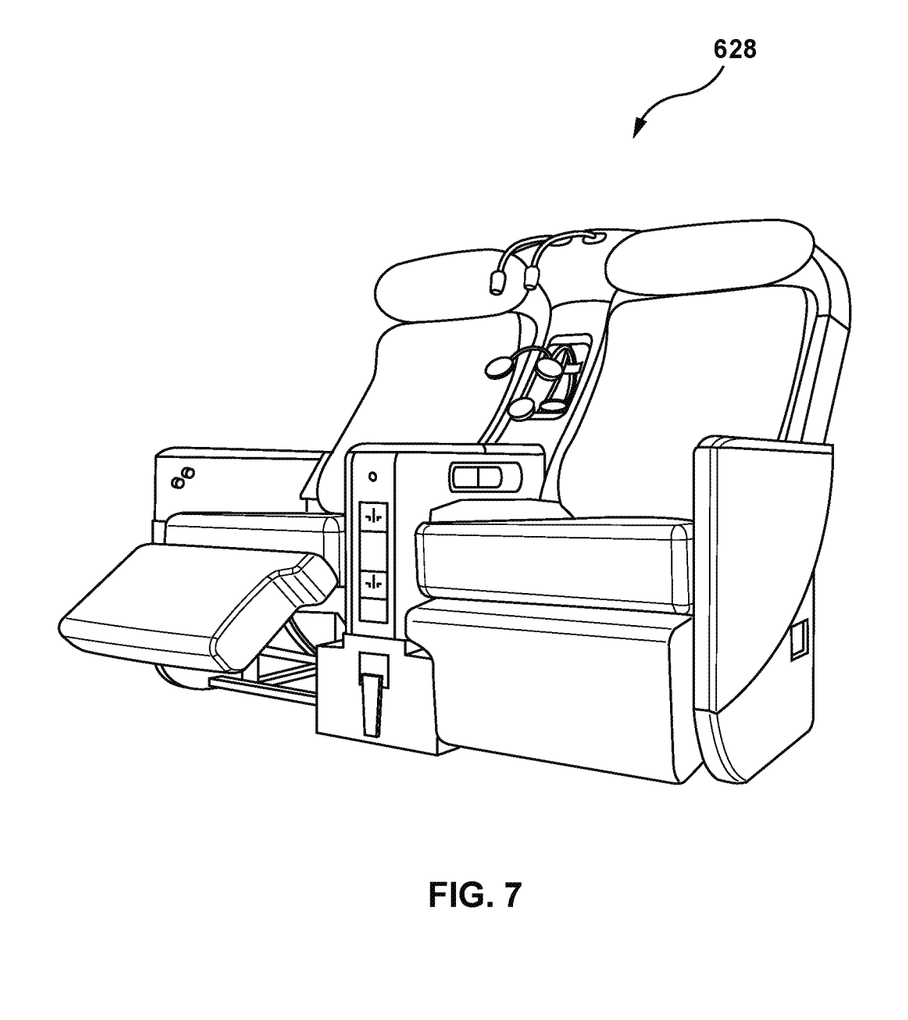
FIG. 7 shows an example of a detailed and rich rendering of an airline seat that can be selected during the example session of FIG. 6.

Block 432 comprises generating a response to the request from block 404 according to the selections applied at block 420 and block 428. Where different platforms 104 can accommodate the same content, but have different capabilities for presenting that content, then the generation of the response can include adaptations to the selected content respective to the specific capabilities of the target platform 104. To help elaborate, and referring again to our specific example, in association with a fully capable metaverse platform 104-2 and client device 120-4, the full seat map could include a nearly complete rendering of the entirety of the interior cabin of aircraft 612, having very rich textures and visual appearance of seat 628, such as the view of seat 628 in FIG. 7. Processor 116-208 in adaptation engine 116 can thus be configured to interact with target platform 104-2 so that all features of the seat can be viewed at client device 120-4 over session 504. Furthermore, by shifting to a third person perspective avatar 606 can be shown sitting in the seat and accessing its various virtual features, all of which would mimic the actual performance of the seat on the aircraft 612. Using method 400, additional seat choices can be loaded and rendered within session 504 in similar fashion, until an actual selection of seat was made thus advancing the entire workflow of selecting various travel services. Note that the same content may be possible to generate on platform 104-3, but with different limitations, such as number of pixels or colours, or other variables, then block 432 can include an adaptation that is effected to accommodate the different limitations of platforms 104 that are otherwise capable of generating substantially the same content.

A person of skill in the art can now appreciate just where the virtual reality experience can extend to what additional filters may be applied at block 428, as such that in a fully capable client device 120-4 such as client device 120-4, the user of client device 120-4 could virtually "walk" through the cabin via feedback and input from the treadmill input/output device on client device 120-4, providing visual feedback of the entire walk through the aircraft. Occupied seats would show avatars inside them, while available seats would be empty for the avatar 606 to simulate virtually sitting various empty seats. With the full set of haptic feedback provided to hands, torso and feet, and a mapping of the physical size of the user, the user of client device 120-4 could control virtual reclining and test out the widths and foot room of the various seats with appropriate feedback and control signals being sent to the input and output device hardware associated with that client device 120-4. The inventors fully appreciate that the limits of this example correspond to the physical limits of the virtual reality input and output devices associated with client device 120-4, but also note that the rapid development of such rigs suggests a continuum of greater offerings and such offerings are likely to extend over the coming years.

Figure 8:
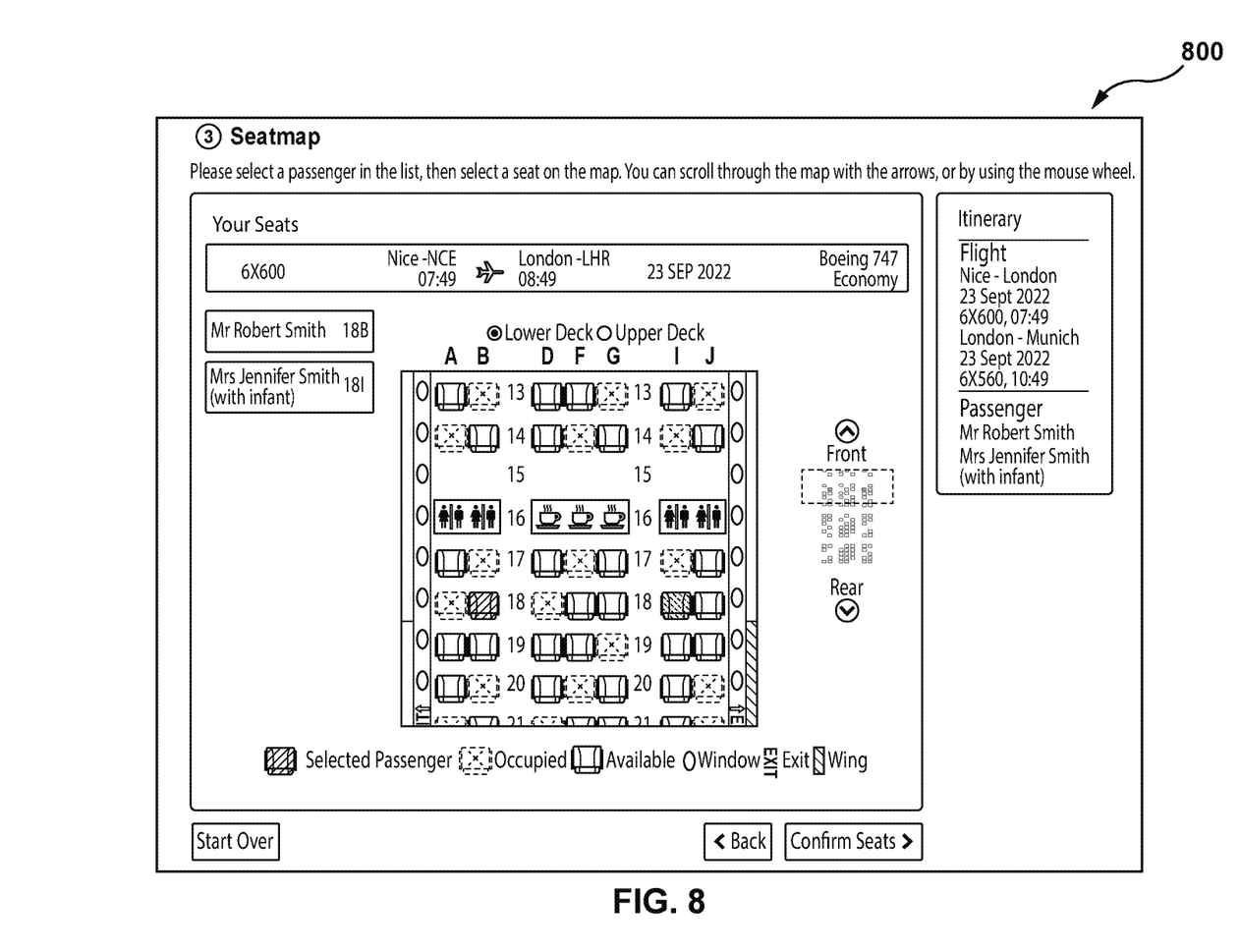
FIG. 8 shows an example of a non-rich rendering of an airline seat selection map that can be selected during a session between a client device and a given platform having fewer capabilities than the session represented in FIG. 5.

A person of skill in the art can now appreciate that system 100 also remains compatible with other client devices 120 and platforms 104. Notably, where a platform 104 or a client device 120 does not have full metaverse capability then system 100 and adaption engine 116 remains flexible to accommodate different technologies. For example, where a seat map request was generated by a mere virtual reality headset 120-1, the seat map response at block 432 would be limited to a virtual view of the inside of the aircraft, but the capability to "walk" through the aircraft would be limited to the mouse or keyboard attached to the computer that connects to the headset 120-1. There would also be curtailed or no opportunity to virtually "sit" in the seat and test the reclining and foot room. As a second example, where the seat map request was generated by laptop computer client machine 120-5, and the platform was travel website platform 104-n, then the filters applied at block 428 would be limited to generating a seat map that is consistent with currently known browser-based seat mapping and seat selection technology, in the form of a two dimensional array of boxes roughly laid out in grid, such as the example seat map 800 in FIG. 8. System 100 can also accommodate traditional travel service acquisitions through voice telephony and text such as short message service (SMS).

A person skilled in the art will now appreciate that the teachings herein can improve the technological efficiency and computational and communication resource utilization across system 100. As the range of available hardware input and output devices for client devices expand, as metaverse and multimedia platform environments create additional contexts for the delivery of travel agency services. The richness of experience combined with the convenience for users creates the opportunity for greater expectation management as to what travel services are actually being acquired. At the same time the sheer diversity of client devices and platforms creates a pull the opposite direction, as there is a need to ensure that travel asset inventories (such as which airline seats, hotel rooms, restaurant booking times, have been sold and which remain open) are constantly updated in real time so that accurate inventory choices are being generated at the time a session for selection of such inventory is occurring between any given client machine and any given platform. The filtering of unneeded content for less capable client machines also reduces network resource stress on network 106, by only delivering the content that can actually be utilized by the given client device 120. The result is efficient use of computing resources, including processing, memory and communication resources, across system 100 and its variants, while providing as rich an experience as possible according to the resource capabilities of the client devices 120 and the platforms 104.

In summary, the present specification provides a content normalization server and method. The specification can have particular application to client devices with augmented or virtual reality hardware that interact with different platforms with metaverse capabilities. Rich experiences are provided on client hardware while making efficient use of available processing, memory and communication resources.

In view of the above it will now be apparent that variants are contemplated. For example, the foregoing has been discussed in relation to the travel industry, it will now be understood that the above-described embodiments can be modified to other industries. For example, an online e-commerce environment such as Amazon™ that becomes enhanced through virtual reality metaverse offerings can be enhanced using the teachings herein. Example additional industries include vehicle purchases from dealerships, medical services from medical clinics, and real estate services from real estate agencies.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. An adaptation engine comprising:
a network interface configured to communicate with a platform server configured to provide a session with a client device; and
a processor having access to a memory storing content for rendering over the session;
the processor configured to:
receive a request for content to be delivered to the client device from the platform server;
determine a platform server computing resource capability;
determine a client device computing resource capability;
define a session computing resource capability for the session based on the platform server computing resource capability and the client device computing resource capability;
access, from the memory, essential content respective to the request;
access, from the memory, additional content augmenting the essential content, based on the session computing resource capability; and,
generate a response to the request based on the essential content and the additional content.

2. The adaptation engine of claim 1 wherein the platform server includes one or more of an augmented reality environment, a virtual reality environment or a metaverse.

3. The adaptation engine of claim 1 wherein the request is automatically generated by the platform server based on contextual demographic information of an account associated with the client device accessing other content hosted by the platform server.

4. The adaptation engine of claim 1 wherein the client device capability includes augmented reality hardware or virtual reality hardware.

5. The adaptation engine of claim 1 wherein the processor is further configured to select the essential content and any additional content by from aggregated content the combines a plurality of different content.

6. The adaptation engine of claim 4 wherein the other content is stored on different content engines accessible to the adaptation engine via a content aggregation engine.

7. The adaptation engine of claim 1 wherein the platform server is a website and the computing resource capability is one of a laptop computer, a desktop computer or a mobile phone.

8. The adaptation engine of claim 1 wherein the request includes an electronic request for content relating to travel services directly from the client device.

9. The adaptation engine of claim 8 wherein the request includes a seat selection on a transportation vehicle.

10. The adaptation engine of claim 1 wherein the request a selection of a resource offered by one or more of an airline, a railway system, a car rental agency, a cruise line operator, a hotel, a restaurant, a resort or a spas.

11. A method for multi-platform content normalization comprising:
receiving a request for content to be delivered to a client device from a platform server;
determining a platform server computing resource capability of the platform server;
determining a client device computing resource capability of the client device;
defining a session computing resource capability for the session based on the platform server computing resource capability and the client device computing resource capability;
accessing, from a memory, essential content respective to the request;
accessing, from the memory, additional content augmenting the essential content, based on the session computing resource capability; and,
generating a response to the request based on the essential content and the additional content.

12. The method of claim 11 wherein the platform server includes one or more of an augmented reality environment, a virtual reality environment or a metaverse.

13. The method of claim 11 wherein request is automatically generated by the platform server within based on contextual demographic information of an account associated with the client device accessing other content hosted by the platform.

14. The method of claim 11 wherein the client device capability includes augmented reality hardware or virtual reality hardware.

15. The method of claim 11 wherein the processor is further configured to select the essential content and any additional content by from aggregated content the combines a plurality of different content.

16. The method of claim 13 wherein the other content is stored on different content engines accessible to the adaptation engine via a content aggregation engine.

17. The method of claim 11 wherein the platform server a website and the computing resource capability is one of a laptop computer, a desktop computer or a mobile phone.

18. The method of claim 11 wherein the request includes an electronic request for content relating to travel services directly from the client device.

19. The method of claim 11 wherein the request includes a seat selection on a transportation vehicle.

20. The method of claim 11 wherein the request includes a selection of a resource offered by one or more of an airline, a railway system, a car rental agency, a cruise line operator, a hotel, a restaurant, a resort or a spas.

* * * * *